United States Patent
Chandrashekhar et al.

(10) Patent No.: US 10,764,112 B2
(45) Date of Patent: Sep. 1, 2020

(54) MANAGEMENT AND CONTROL SYSTEM LOGICAL NETWORK

(71) Applicant: Nicira, Inc., Palo Alto, CA (US)

(72) Inventors: Ganesan Chandrashekhar, Campbell, CA (US); Alexander Tessmer, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 481 days.

(21) Appl. No.: 15/639,927

(22) Filed: Jun. 30, 2017

(65) Prior Publication Data
US 2018/0248743 A1    Aug. 30, 2018

Related U.S. Application Data

(60) Provisional application No. 62/464,805, filed on Feb. 28, 2017.

(51) Int. Cl.
*H04L 12/24* (2006.01)
*G05B 19/042* (2006.01)

(52) U.S. Cl.
CPC ........ *H04L 41/046* (2013.01); *G05B 19/0423* (2013.01); *H04L 41/0806* (2013.01); *G05B 2219/25022* (2013.01)

(58) Field of Classification Search
CPC ............. H04L 41/046; H04L 41/0806; G05B 19/0423; G05B 2219/25022

USPC .......................................... 709/202
See application file for complete search history.

(56) References Cited

U.S. PATENT DOCUMENTS

| | | | |
|---|---|---|---|
| 2015/0052262 A1* | 2/2015 | Chanda ............... | H04L 61/2015 709/245 |
| 2015/0052522 A1* | 2/2015 | Chanda ................... | G06F 9/455 718/1 |
| 2015/0263899 A1* | 9/2015 | Tubaltsev ............... | H04L 45/02 370/254 |
| 2015/0263946 A1* | 9/2015 | Tubaltsev ............. | H04L 45/586 370/392 |

* cited by examiner

*Primary Examiner* — Nicholas R Taylor
*Assistant Examiner* — Chong G Kim
(74) *Attorney, Agent, or Firm* — Adeli LLP

(57) ABSTRACT

Some embodiments provide a method for connecting a host machine to a management and control system (MCS) logical network. The method of some embodiments receives, at a managed forwarding element of the host machine, data that identifies a bootstrap agent. The method of some such embodiments receives this data once the host machine is booted up. The method connects to the agent to receive configuration data for the MCS logical network from the agent. The method uses the configuration data received from the agent to connect to the MCS logical network. After connecting to the MCS logical network, the method receives the necessary configuration data for at least one additional logical network (e.g., a guest logical network) from a set of control machines that is also connected to the MCS logical network.

21 Claims, 7 Drawing Sheets

MANAGEMENT AND CONTROL SYSTEM LOGICAL NETWORK

BACKGROUND

A logical network is an overlay network, which may be configured by a management and control system (e.g., of a hosting system) to logically connect a set of machines to each other. Different machines of the management and control system configure the hosting system's physical network to implement an overlay network (e.g., for a tenant of the hosting system). As such, for an overlay network to be configured, the manager and controller machines of the management and control system should be configured first.

In a typical L2-based hosting system (e.g., an on-premises datacenter), the management and control system connects to a VLAN-backed network to which other host machines of the hosting system are connected. This way, the management and control system exchanges the management and control traffic with the host machines and each other in order to implement one or more logical networks. In certain L3-based hosting systems (e.g., many public clouds), however, there are no isolated VLAN-backed networks and therefore the host machines that run the workloads of different overlay networks do not have an easily identifiable access to the manager and controller machines of the management and control system.

BRIEF SUMMARY

Some embodiments provide a method for receiving configuration data from a management and control system (MCS) logical network in order to implement one or more guest logical networks. The MCS logical network of some embodiments logically connects a set of MCS machines (e.g., manager machines, controller machines, edge machines, etc.) to each other and to other logical networks such as one or more guest logical networks created for one or more tenants of a hosting system. Through the MCS logical network, the MCS machines configure a set of managed forwarding elements (MFEs) executing on a set of host machines to implement different logical forwarding elements (e.g., logical switches, logical routers, etc.) of the guest logical networks.

Some embodiments employ a bootstrap agent for configuring the host machines (e.g., guest host machines) to communicate with the MCS logical network (i.e., with the MCS machines connected to the MCS logical network). In some embodiments, when a host machine starts up, the host machine receives configuration data that identifies a bootstrap agent for which the MCS logical network is defined (e.g., by a network administrator). The configuration data for identifying the bootstrap agent, in some embodiments, is received from a host profile defined for the host machine to use when the host machine boots up. In some embodiments, the configuration data includes an Internet Protocol (IP) address of a particular machine that executes the agent, a Uniform Resource Locator (URL) address for the particular machine, or any other form of identification data for the machine that enables the managed forwarding element in the host machine to reach the bootstrap agent.

The bootstrap agent, in some embodiments, is a data compute node (DCN) that executes separate from the host machines that implement the logical networks. For instance, some embodiments implement the guest logical networks on a set of guest host machines of a public hosting system (e.g., a public datacenter). In some such embodiments, the bootstrap agent is a DCN that operates on a host machine of the hosting system that is separate from the guest host machines. In some embodiments, the bootstrap agent is a dedicated server (e.g., a bare metal server) that exclusively provides configuration data for identifying the MCS logical network.

After identifying the bootstrap agent, the host machine receives the required configuration data from the agent to connect to the MCS logical network in some embodiments. The required configuration data includes, e.g., a virtual network identifier (VNI) or other identification data associated with the MCS logical network, a set of virtual tunnel endpoint (VTEP) addresses associated with the MCS machines, etc. After a guest host machine receives the configuration data from the bootstrap agent, some embodiments configure the MFE executing on the host machine to communicate with the MCS machines on the MCS logical network.

That is, some embodiments configure the MFE to implement a logical switch that connects the machines of the MCS logical network. For example, in some embodiments, a particular interface (e.g., a virtual interface) of the MFE is connected to a logical port of the MCS logical switch. The other MCS machines are also connected to the other ports of the MCS logical switch in some such embodiments. This way, the MCS machines can communicate with the guest host machine and provide the host machine with the necessary configuration data for implementing the logical forwarding elements of additional guest logical networks. That is, the configuration and other control/management data is exchanged between the control and management machines and the MFEs as logical network traffic for this particular MCS logical network.

In some embodiments, the host machines that host the DCNs of the guest logical networks are different from the host machines that host the control and management machines that connect to the MCS logical network. Some embodiments designate a particular set of host machines (e.g., guest host machines) for servicing the guests of a hosting system (e.g., to execute the DCNs of the guest tenants), while designating a different set of host machines (e.g., control host machines) to execute the MCS machines. In some embodiments, the MCS machines and guest DCNs, however, can run on the same host machines of the hosting system.

Since all of the guest host machines implementing the guest and MCS logical networks and the control host machines implementing the MCS logical network are connected to the same underlying physical network (e.g., a datacenter physical network), the configuration data exchanged between the host machines and the MCS machines is encapsulated using one or more tunneling protocols. That is, in some embodiments, the MCS machines encapsulate the forwarding data that defines the forwarding behavior of the MFEs using a particular tunneling protocol (e.g., Virtual Extensible Local Area Network (VXLAN), GENEVE, Stateless Transport Tunneling (STT), etc.). The MCS machines then tunnel the encapsulated configuration data to the MFEs of the host machines. The MFEs, upon receiving the encapsulated configuration data, decapsulate the data using the same tunneling protocol and then use the decapsulated configuration data to implement the different logical networks.

The MCS machines configure and maintain all the logical networks implemented by the hosting system (e.g., on an L3-based network of the hosting system) except the MCS logical network in some embodiments. That is, in some embodiments, the MCS machines are not allowed to modify any configuration data related to the MCS logical network. For example, when a particular port of an MFE implements a logical port that is assigned to communicate with the MCS logical network, the management and control planes cannot change the configuration of that particular port. In other words, the management and control planes are not authorized to update the data for any VTEP and/or other forwarding tables that are related to the MCS logical network. In order to prevent the MCS machines from modifying the configuration of the MCS logical network, some embodiments tag the VNI associated with the MCS logical network as a VNI that is not manageable by the MCS machines.

When a host machine, which is connected to an MCS logical network, needs to be decommissioned (i.e., to be removed from the host machines that implement the logical networks), the bootstrap agent and other host machines need to be informed of such a decommissioning. As discussed above, the MCS machines do not have control over the MCS logical network in order to update the configuration data for this logical network (e.g., update the VTEP and VNI tables of the remaining host machines to remove the decommissioned host), and thus the bootstrap agent is responsible for handling this removal.

In some embodiments, every time a host machine is decommissioned the MCS machines (e.g., a manager machine of the MCS) informs the other host machines of such. The informed host machines then send a request to the bootstrap agent and receive updated configuration data from the agent to update their configuration tables (i.e., to remove the decommissioned host's data from their configuration and forwarding tables).

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
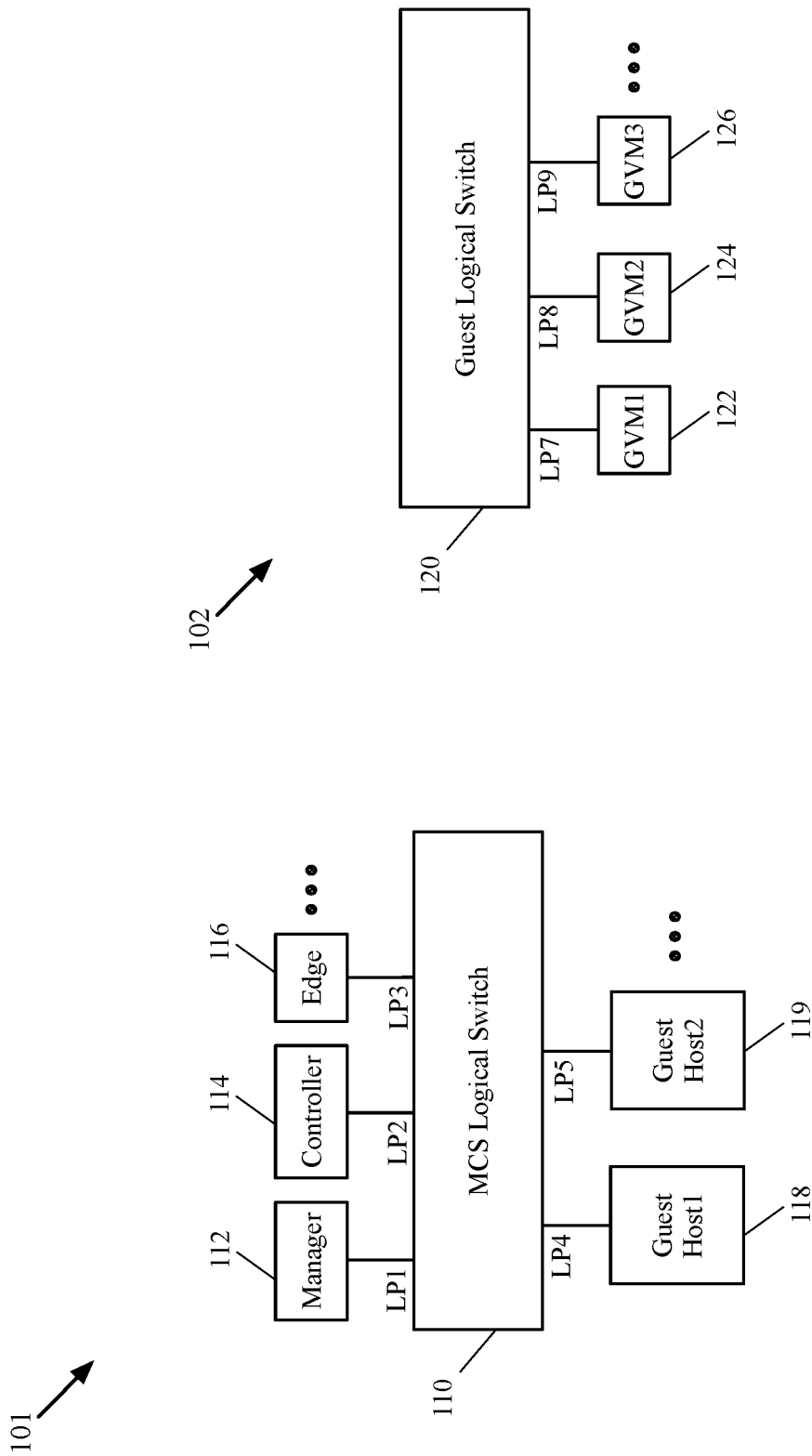
FIG. 1 illustrates logical views of a management and control system (MCS) logical network and a guest logical network that is configurable (on a set of managed forwarding elements) by the MCS logical network.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for receiving configuration data from a management and control system (MCS) logical network in order to implement one or more logical networks. The MCS logical network of some embodiments logically connects a set of MCS machines (e.g., manager machines, controller machines, edge machines, etc.) to each other and to other logical networks such as one or more guest logical networks created for one or more tenants of a hosting system. Through the MCS logical network, the MCS machines configure a set of managed forwarding elements (MFEs) executing on a set of host machines to implement different logical forwarding elements (e.g., logical switches, logical routers, etc.) of the guest logical networks.

For a typical L2-based hosting system (i.e., the physical network of the hosting system such as an on premises datacenter is L2-based), a user defines a logical network for the management and control system of the network. The logical network connects a set of end machines (e.g., virtual machines (VMs) or any other type of data compute nodes such as containers, namespaces, etc.) to each other and to other networks (physical and/or logical networks). The MCS machines configure the different logical network entities (e.g., logical forwarding elements, logical middleboxes, etc.) on different host machines that execute the end machines of the logical network.

The logical forwarding elements to which the end machines are connected are implemented by one or more managed forwarding elements that operate (executes) on each host machine in some embodiments. A managed forwarding element, operates in a virtualization software (e.g., a hypervisor) of a host machine. The set of logical forwarding elements is also implemented by one or more managed hardware forwarding elements (e.g., a top-of-rack switch) through physical ports of which, a set of physical machines (e.g., physical servers) logically connects to the logical network.

A logical network, in some embodiments, in addition to several different L2 and L3 logical forwarding elements (e.g., logical switches and logical routers), includes other logical network entities (e.g., logical firewall, logical load balancer, etc.) that are placed on different logical paths of the logical network. Through these logical network entities, several different data compute nodes (DCNs) that run on different host machines connect to each other, to other physical machines of the logical network (e.g., physical machines connected to managed hardware forwarding elements, hardware routers, etc.), and to other end machines of other networks.

In some embodiments, a user defines a logical network topology (i.e., defines the logical network entities and the connections between these entities) for a logical network through a management and control system. The MCS of a logical network, in some embodiments, includes one or more manager machines (or manager applications) through which the different logical network entities are defined (e.g., through API calls, user interfaces, etc.). The MCS also includes one or more controller machines (or applications) that configure the managed forwarding elements on the host machines and control the forwarding of data between the MFEs for the logical network.

After receiving the logical network definitions, the MCS generates the configuration and forwarding data for the logical network and pushes this data to a set of physical nodes (e.g., host machines, gateway machines, etc.) that are also connected to the L2-based (i.e., VLAN-backed) physical network. The configuration and forwarding data that is distributed to the physical nodes defines common forwarding behaviors of the MFEs that operate on the physical nodes in order to implement the logical forwarding elements (LFEs). The configuration data also configures the virtualization software of the host machines to implement other logical network elements (e.g., to instantiate a distributed firewall instance on each hypervisor that implements the logical firewall). In some embodiments, a local controller that operates on each physical node (e.g., in the hypervisor of a host machine) receives the configuration and forwarding data from the MCS machines.

The local controller then generates customized configuration and forwarding data that, for example, defines specific forwarding behavior of an MFE that operates on the same host machine as the local controller and distributes the customized data to the MFE. The MFE implements the logical forwarding elements of the logical network based on the configuration and forwarding data received from the local controller. Each MFE can be connected to several different DCNs, different subsets of which may belong to different logical networks (e.g., for different tenants). As such, the MFE is capable of implementing different sets of logical forwarding elements for different logical networks.

For a hosting system that is implemented on an L3-based network in which separate VLANs are not easily identifiable, however, the MCS machines cannot be directly connected to the other physical nodes of the network. In order to connect the MCS machines to the other physical nodes, some embodiments define an MCS logical network to which, the different controller and management machines of the MCS are logically connected. In other words, instead of having a Virtual Local Area Network based (VLAN-based) network to connect the MCS machines to other physical nodes, some embodiments provide a Virtual Extensible Local Area Network based (VXLAN-based) network for such a connection.

The MCS machines, as described, can be virtual machines (VMs), physical machines, or any other type of data compute nodes (DCNs) that communicate control and management data with each other and with other network entities that are connected to the same MCS logical network. In order to make this MCS logical network identifiable to the other physical nodes (e.g., host machines), some embodiments provide a bootstrap agent that has the configuration data for the MCS logical network.

The bootstrap agent, in some embodiments, is a DCN that is not part of the MCS logical network. For instance, the bootstrap agent can be a virtual machine that is particularly instantiated in the public datacenter in order to provide configuration data for the MCS logical network. That is, the bootstrap agent can be a VM that is instantiated on one of the host machines of the datacenter that does not participate in any of the guest logical networks (i.e., a host machine that doesn't execute an end machine that is connected to any of the guest logical networks).

From the bootstrap agent, a guest host machine (i.e., a host machine that participates in at least one guest logical network) receives the required configuration data in order to connect to the MCS logical network in some embodiments. The required configuration data includes, e.g., a virtual network identifier (VNI) associated with the MCS logical network, a set of virtual tunnel endpoint (VTEP) addresses associated with the MCS machines, etc. After the guest host machine receives the configuration data, the MFE executing on the guest host machine is configured to communicate with the MCS machines on the MCS logical network.

That is, some embodiments configure the MFE to implement a logical switch that connects the machines of the MCS logical network. For example, in some embodiments, a particular interface (e.g., a virtual interface) of the MFE is connected to a logical port of the MCS logical switch. The other MCS machines are also connected to the other ports of the MCS logical switch in some such embodiments. This way, the MCS machines can communicate with the guest host machine and provide the host machine with the necessary configuration data for implementing the logical forwarding elements of additional guest logical networks. That is, the configuration and other control/management data is exchanged between the controller and manager machines and the MFEs as logical network traffic for this particular MCS logical network.

FIG. 1 illustrates logical views of a management and control system (MCS) logical network and a guest logical network that is configurable (on a set of managed forwarding elements) by the MCS logical network. More specifically, the logical view 101 shows a logical switch of an MCS logical network that configures a guest logical network, a logical switch of which is shown in logical view 102. Through these MCS and guest logical switches, a set of MCS machines exchange configuration and forwarding data with a set of managed forwarding elements executing on a set of guest host machines. The managed forwarding elements implement the guest and MCS logical switches on the guest host machines.

The figure includes two logical switches 110 and 120. The MCS logical switch 110 is coupled to the manager machine 112, controller machine 114, and edge machine 116, as well as two guest host machines 118 and 119. As will be described in more detail below by reference to FIG. 2, the end machines that are connected to these two logical switches can be distributed across different control host machines and guest host machines. The three MCS machines 112-116 are coupled to the MCS logical switch 110 through three different logical ports LP1-LP3 of the logical switch while the guest host machines are coupled to the logical switch through the logical ports LP4 and LP5.

The guest logical switch 120 is coupled to three guest virtual machines 122-126, as well as other guest VMs and/or DCNs that are not shown in the example. The three guest VMs 122-126 are coupled to the guest logical switch 120 through three different logical ports LP7-LP9 of the logical switch. These logical switches and their corresponding logical networks are defined by a hosting system network administrator in some embodiments. In some embodiments, the MCS logical network is defined by a datacenter provider, while the guest logical networks are defined by the tenants of the datacenter.

It is important to note that for simplicity of the description, only three MCS machines and three guest DCNs are shown in the figure, whereas in reality, a cluster of numerous controllers and/or managers configures and manages many different logical networks that each may include numerous DCNs connected to each other and to other networks. It is also important to note that although each logical network (i.e., the MCS logical network and the guest logical network) in the illustrated example includes only a single logical switch, each of these logical networks may include many other logical forwarding elements such as other logical switches and logical routers. A guest logical network may also include other logical entities such as logical middleboxes (e.g., logical load balancers, logical firewalls, etc.).

The two guest host machines 118 and 119 couple to the MCS logical switch 110 to receive configuration data for implementing the guest logical switch 120 on the host machines. Each of these host machines includes a managed forwarding element and hosts a set of DCNs that connects to the logical switch 120. In other words, even though all three GVMs 122-126 are connected to the same logical switch 120, the MCS logical switch 110 may be configured on the guest host machines 118 and 119 in such a way that each host machine (i.e., each MFE running on each host machine) implements different logical ports of the logical switch 110. In addition, it should be noted that if multiple guest logical networks are configured on the host machines by the MCS, additional guest hosts that do not host any machines connected to the guest logical switch 120 may connect to the MCS logical switch 110 (i.e., because they host machines connected to other logical forwarding elements).

The configuration data that is pushed to the MFEs may configure the MFEs to map different logical ports of the logical switch 120 to different physical (or software) ports of the MFEs in some embodiments. As will be discussed by reference to FIG. 2 below, the MCS logical switch 120 could also be implemented across different host machines of the hosting system in some embodiments (e.g., a set of control host machines which are different from the guest host machines).

Figure 2:
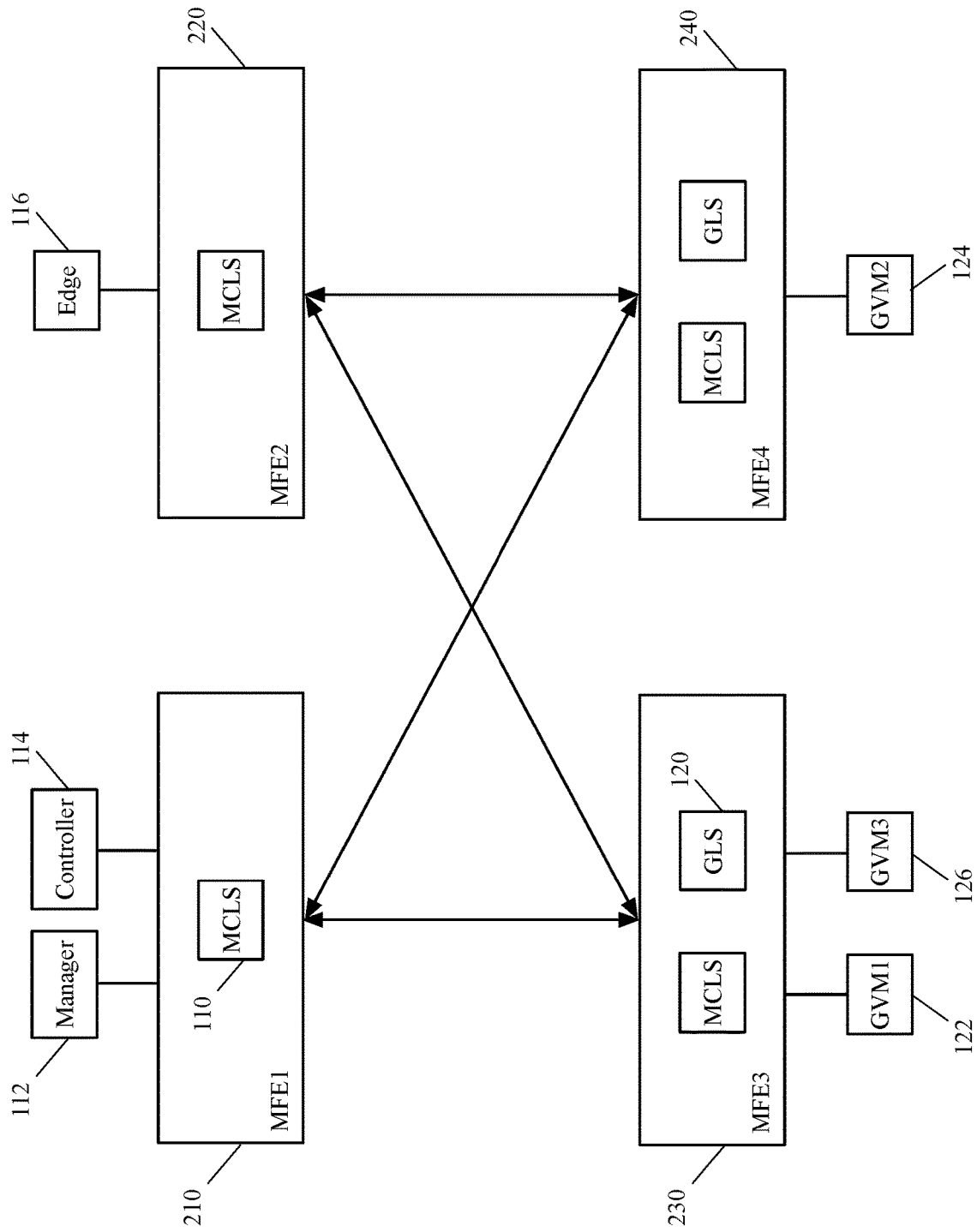
FIG. 2 illustrates an example of receiving configuration data from the different MCS machines of an MCS logical network by the managed forwarding elements in order to implement a logical switch of a guest logical network.

FIG. 2 illustrates an example of receiving configuration data from the different MCS machines of an MCS logical network by the MFEs in order to implement a logical switch of a guest logical network. Specifically, this figure shows the guest MFEs 230 and 240 that execute on guest host machines 118 and 119 shown in FIG. 1, respectively. These guest MFEs receive configuration data from the two control MFEs 210 and 220 in order to implement the logical ports of the logical switch 120 that are coupled to the end machines 122-126.

That is, although the guest host machines are not shown in this figure, the guest MFE 230 operates on the hypervisor of the host machine 118 which hosts the GVMs 122 and 126 (along with other GVMs of the same logical network or other logical networks). Similarly, the guest MFE 240 executes on a virtualization software of the host machine 119 which hosts the GVM 124 (along with other GVMs of the same logical network or other logical networks).

FIG. 2 also shows that manager and controller machines 112 and 114 are coupled to MFE 210 while the edge machine 116 is couple to the MFE 220. As shown, each of the control MFEs 210 and 220 implements the MCS logical switch 110, while each the guest MFEs 230 and 240 implements both of the MCS logical switch 110 and the guest logical switch 120. More particularly, the manager and controller machines 112 and 114 are coupled to physical ports of MFE 210 which implement the logical ports LP1 and LP2 of the MCS logical switch 110. Similarly, the edge machine 116 is coupled to a physical port of MFE 220 which implements the logical port LP3 of the MCS logical switch 110.

An edge machine, in some embodiments, provide different edge services for the MCS logical network. For example, a user can manage the different logical network entities (e.g., MCS machines) through a user interface that is provided by an edge VM connected to the MCS logical network. In other words, the management appliances can be managed by a user outside of the MCS logical network through the edge machine 116.

As shown, each of the guest MFEs 230-240 has a northbound interface that is dedicated for configuration data exchange. That is, as soon as the guest MFEs identify the MCS logical network, each MFE assigns a particular software port of the MFE to implement the logical port of the MCS logical switch to which the host machine of the MFE 15 connected. For instance, in the illustrated example, the logical port LP4 of the MCS logical switch is mapped to a physical port of the MFE 230 for management and control traffic communication. Similarly, the logical port LP5 of the MCS logical switch is mapped to a physical port of the MFE 240 for exchanging management and control traffic data. Through these physical ports the MFEs 230 and 240 receive configuration data for implementing the logical ports of the guest logical switch 120, to which the GVMs 112-116 are connected.

The management and control system machines are not authorized to change the configuration of the ports of the MFEs that are assigned for management and control traffic communication. In some embodiments, the same port of each guest MFE is assigned for control traffic communication (e.g., a particular port associated with a particular VNIC number on each MFE is assigned for this purpose). Although MCS machines of the network configure and manage all of the logical networks implemented by the hosting system (e.g., by an L3-based network of the hosting system), the MCS machines do not configure and/or manage the MCS logical network in some embodiments.

When a guest host machine receives the configuration data for the MCS logical network, the host machine makes sure that this MCS logical network is not updated by the management and control planes (which update all other guest logical networks). For example, the management and control planes are not authorized to update the data in any VTEP and/or other forwarding tables that are related to the MCS logical network. In order to prevent the MCS machines from modifying the configuration of the MCS logical network, some embodiments tag a VNI that is associated with the MCS logical network as a VNI that is not manageable by the MCS machines.

As stated above, each of the guest MFEs 230-240 and the control MFEs 210-220 executes on a different host machine. In some embodiments, the host machines that host the DCNs of the guest logical networks are different from the host machines that host the MCS machines that connect to the MCS logical network. Some embodiments designate a particular set of host machines (e.g., guest host machines) for servicing the guests of a hosting system (e.g., to execute the DCNs of the guest tenants). Some such embodiments designate a different set of host machines (e.g., control host machines) to execute the MCS machines. In some embodiments, the MCS and guest machines, however, run on the same host machines of the hosting system.

Since all of the guest host machines that implement the guest logical networks and the MCS machines are connected to the same MCS logical network (i.e., each guest host machine is coupled to a logical port of the MCS logical network), the configuration data is tunneled between the host and MCS machines. In other words, since all of the guest host machines implementing the guest and MCS logical networks and the control host machines implementing the MCS logical network are connected to the same underlying physical network (e.g., a datacenter physical network), the configuration data exchanged between the host machines and the MCS machines is encapsulated using one or more tunneling protocols.

In some embodiments, the MCS machines encapsulate the forwarding data that defines the forwarding behavior of the MFEs using a particular tunneling protocol (e.g., Virtual Extensible Local Area Network (VXLAN), GENEVE, Stateless Transport Tunneling (STT) protocol, Secure Socket Tunneling Protocol (SSTP), etc.). The MCS machines then tunnel the encapsulated configuration data to the MFEs of the host machines. The MFEs, upon receiving the encapsulated configuration data, decapsulate the data using the same tunneling protocol and then use the decapsulated configuration data to implement the different logical networks.

The straight double-arrowed lines between the different MFEs 210-220 and 230-240 in FIG. 2 represent the different tunnels that are established between these MFEs in order to carry the configuration data of the logical networks. The two arrows shown on each side of the tunnels show that the configuration data is forwarded in both directions. That is, not only the guest MFEs 230 and 240 receive the configuration data from the control MFEs 210 and 220, but also the guest MFEs return the runtime data received at the guest host machines (e.g., runtime data related to the configurations of the GVMs running on the host machines) to the control MFEs in order to update the configuration data of the logical networks.

Although the configuration data communication is shown to be directly between the guest and control MFEs in the figure, as described above, in some embodiments a local controller operating on each host machine receives the configuration data from the control MFEs (through an established tunnel). The local controller then customizes the received configuration data for an associated MFE and delivers the customized configuration data to the MFE. In some embodiment, each pair of local controller and its corresponding MFE executes on the hypervisor of each host machine.

As an example, in the illustrated figure, the manager machine 112 receives (from a tenant) a definition of a logical switch with a logical port that is coupled to a virtual machine 124. The manager machine 112 generates and sends configuration packets to the control MFE 210 (through an interface of the control MFE that is mapped to the logical port of the MCS logical switch coupled to the manager machine 112).

The control MFE 112 encapsulates the received packets using the VXLAN tunneling protocol and tunnels the encapsulated packets to the guest MFE 240 (e.g., through a local controller that runs on the same machine as the MFE 240). The guest MFE 240 decapsulates the received packets and assigns a port of the MFE, based on the received configuration data, to connect to the GVM 124 in order to implement the logical port to which this GVM is coupled.

It is important to note that each one of the guest MFEs can receive configuration data for implementing multiple different logical networks and not just one logical network. For example, an MFE may receive (1) configuration data for configuring the first port of the MFE to implement a logical port of a logical switch belonging to a first logical network and (2) configuration data for configuring the second port of the MFE to implement a logical port of a logical switch belonging to a second logical network. The first port of the MFE can be coupled to an end machine for a first tenant, while the second port is coupled to another end machine for a second tenant of the hosting system. The configuration data for implementing these two logical switches of different logical networks, however, can be received from the same MCS logical network. Furthermore, the first and second logical networks may belong to the same tenant of the hosting system and not necessarily to different tenants.

As described above, some embodiments employ a particular bootstrap agent for configuring the host machines (e.g., guest host machines) to communicate with the MCS logical network (i.e., with the MCS machines connected to the MCS logical network). In some embodiments when a host machine starts up, the host machine receives configuration data that identifies a bootstrap agent for which the MCS logical network is defined (e.g., by a network administrator). The configuration data for identifying the bootstrap agent, in some embodiments, is received from a host profile defined for the host machine to use when the host machine boots up. In some embodiments, the configuration data includes an Internet Protocol (IP) address of a particular machine that executes the agent, a Uniform Resource Locator (URL) address for the particular machine, or any other form of identification data for the machine.

The bootstrap agent, in some embodiments, is a data compute node (DCN) that executes on a host machine separate from other host machines that implement the logical networks. For instance, some embodiments implement the guest logical networks on a set of guest host machines of a public hosting system (e.g., a public datacenter). In some such embodiments, the bootstrap agent is a DCN that operates on a host machine different from the guest host machines. In some embodiments, the bootstrap agent is a dedicated server that exclusively provides configuration data for identifying the MCS logical network.

Figure 3:
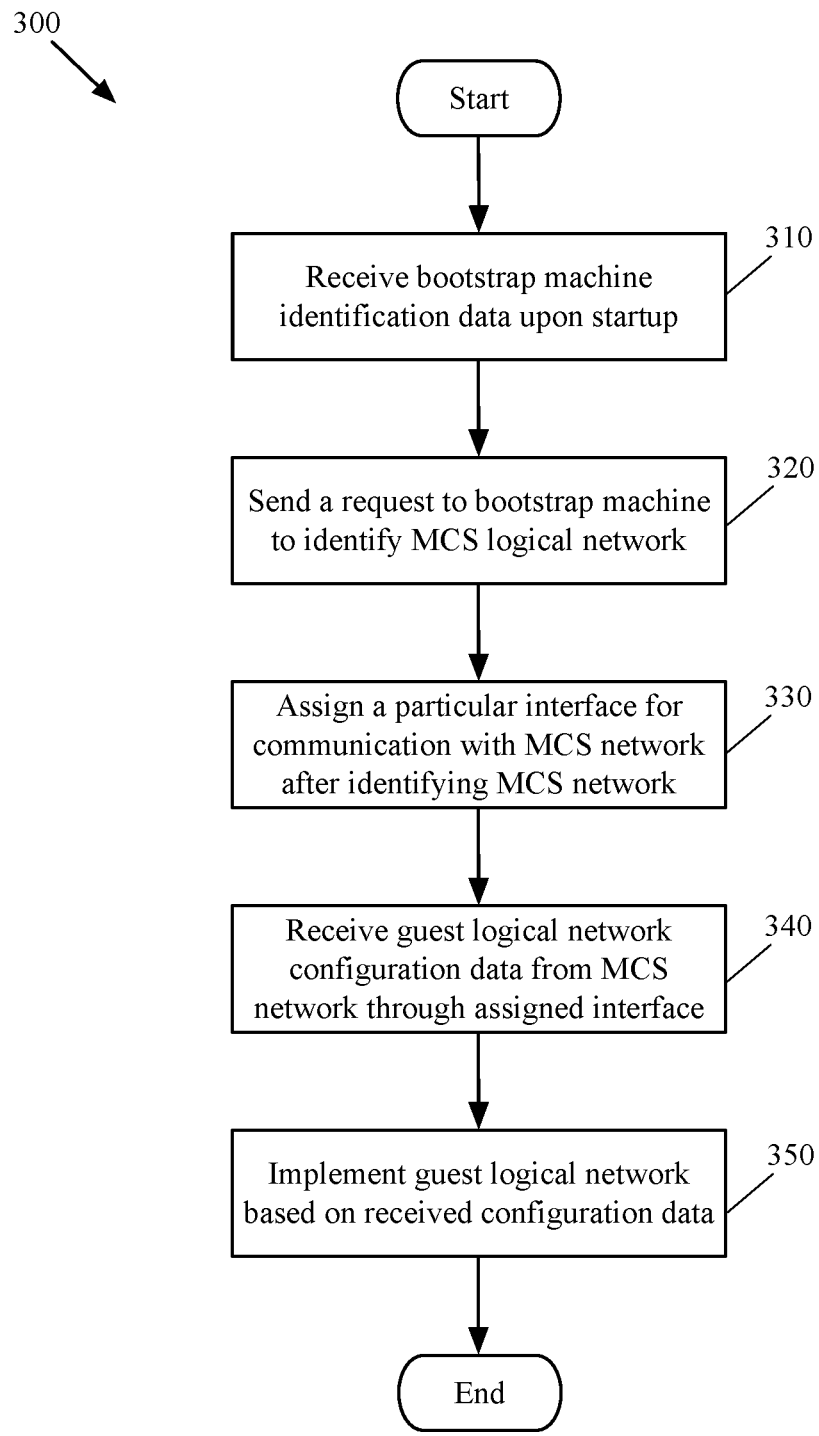
FIG. 3 conceptually illustrates a process of some embodiments for identifying an MCS logical network and receiving configuration data from the identified MCS network to implement one or more guest logical networks.

FIG. 3 conceptually illustrates a process 300 of some embodiments for identifying a management and control system (MCS) logical network and receiving configuration data from the identified MCS network to implement one or more guest logical networks. The process 300 is performed, in some embodiments, by a managed forwarding element executing on a guest host machine upon instantiation of the MFE on the guest host machine (e.g., in the hypervisor of the guest host machine).

The process starts by receiving (at 310) identification data for a bootstrap machine that provides configuration data for an MCS logical network. The identification data for the bootstrap agent, in some embodiments, includes a network address (e.g., an IP address) of the agent which is defined in a profile of the host machine. The configuration of the host machine is set up in such a way that each time the machine boots up (or the MFE is instantiated in the hypervisor of the machine after it boots up), the IP address of the bootstrap agent is provided to the MFE.

After receiving the IP address of the bootstrap agent, the process sends (at 320) a request to the identified address requesting for configuration data of the MCS logical network. The configuration data of the MCS logical network has been defined for the bootstrap agent before by a user (e.g., a datacenter administrator). In some embodiments, after identifying the MCS network, the process automatically assigns a VTEP address to a particular port of the MFE and provides this VTEP address along with the request to the bootstrap agent. This way, the bootstrap agent keeps track of all of the guest host machines that register with the agent to participate in a logical network. In some embodiments, the bootstrap agent may optionally authenticate the host machine before providing any information to the guest host machine.

The process then receives (at 330) the MCS logical network configuration data and assigns a port of the MFE to communicate with the MCS logical network and receive the different guest logical network configuration data through the assigned port. The configuration data for an MCS logical network includes, among other things, a particular VNI that is assigned to the MCS logical network and a set of VTEP addresses of the control MFEs that implement the logical network identified by the VNI (i.e., the MFEs that are connected to at least one MCS machine of the MCS logical network).

The process, upon receiving the VNI of the MCS logical network, marks this VNI to indicate that the management and control planes are not authorized to send and/or receive management and control instructions to and/or from the marked VNI. The process also assigns a port of the MFE to communicate with the MCS machines of the MCS logical network. In some embodiments, the process performs other bootstrapping activities after the MFE is configured to receive configuration data form the MCS logical network.

After assigning a particular port of the MFE for exchanging configuration data with the MCS logical network, the process receives (at 340) the necessary configuration data for implementing different guest logical networks through this physical port of the MFE. For example, the MFE receives the necessary management and forwarding data for implementing the forwarding pipelines of one or more forwarding elements of a logical network that are coupled to a set of virtual machines running on the host machine on which the MFE executes. After receiving the configuration data, the process of some embodiments implements (at 350) the forwarding elements for of the logical network for which the configuration data is received. The process then ends.

The specific operations of the process 300 may not be performed in the exact order shown and described. The specific operations may not be performed in one continuous series of operations, and different specific operations may be performed in different embodiments. Additionally, the process 300 could be implemented using several sub-processes, or as part of a larger macro process.

Figure 4A:
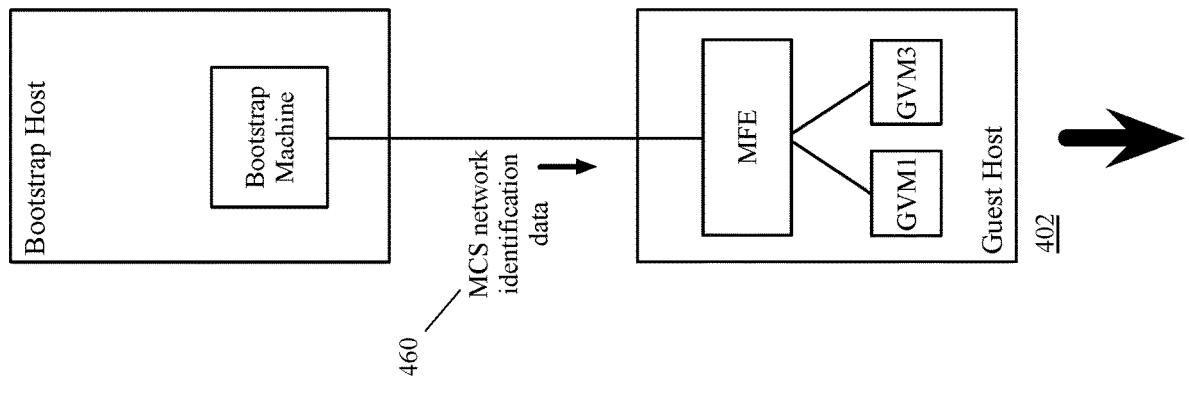
FIGS. 4A-4B illustrate an example of requesting for and receiving identification data associated with an MCS logical network from a bootstrap agent and receiving configuration data from the identified MCS logical network.
Figure 4A:
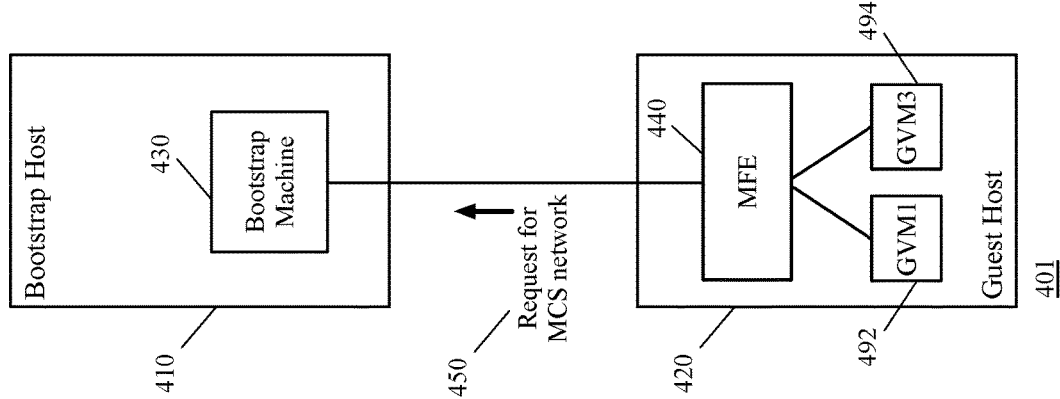
Figure 4B:
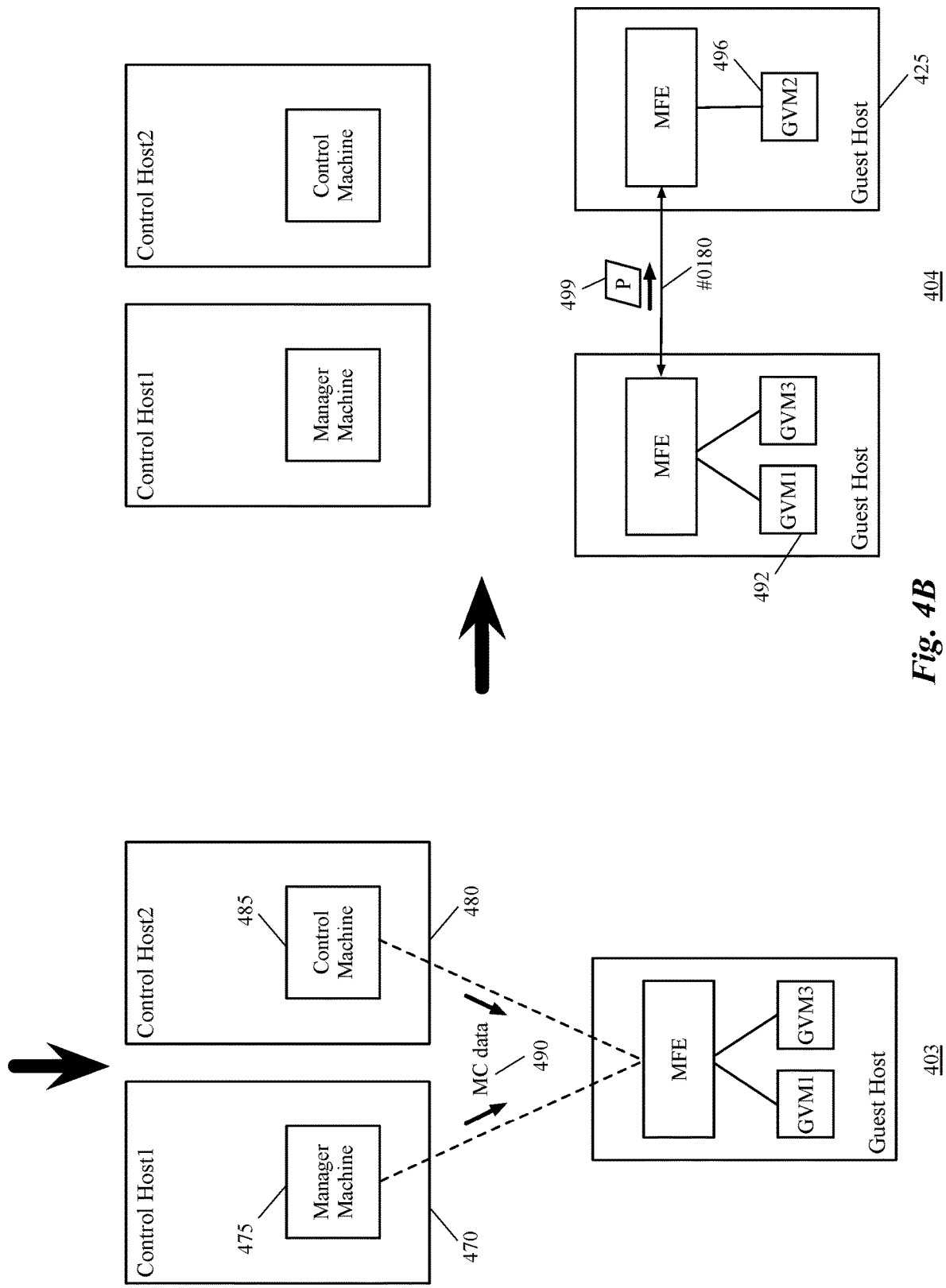

FIGS. 4A-4B illustrate an example of requesting for and receiving identification data associated with an MCS logical network from a bootstrap agent and receiving configuration data from the identified MCS logical network. Specifically, these figures show, through four different stages 401-404, how a guest host machine implementing at least one logical network receives the configuration data for an MCS logical network, receives configuration data from the MCS machines to implement the logical network, and communicates with other host machines by implementing the logical network.

FIG. 4A includes a bootstrap host machine 410 and a guest host machine 420, while FIG. 4B includes two control host machines 470 and 480 and a second guest host machine 425. The bootstrap host executes a bootstrap agent 430, while the manager and control machines 475 and 485 execute on the control host machines 470 and 480. The guest VMs 492 and 494 execute on the guest host machine 420 and the guest VM 496 executes on the guest host machine 425.

It is important to note that even though the host machines are shown to have different names (i.e., bootstrap, guest, and control hosts), all of these hosts can be servers of the same hosting system (e.g., a public cloud). Additionally, although the MCS machines and guest virtual machines are shown to be executing on the control hosts and the guest hosts, respectively, as described above, these machines can be instantiated on the same hosts in some embodiments. Lastly, although the figure only shows the MFEs 440 executing on the guest host machines 420 and 425, the control host machines (i.e., hosts machines 470 and 480) also execute MFEs to which the MCS machines are connected in some embodiments (as illustrated in FIG. 2 which is described above).

The first stage 401 illustrates that upon instantiation of the MFE 440 in the guest host machine 420 (e.g., after the guest host starts up), the MFE sends a request 450 to the bootstrap host machine 410 requesting configuration data for the MCS logical network. As discussed above, the MFE 440 receives the identification data for the bootstrap agent from a startup configuration defined for the guest host machine 420 in some embodiments. This identification data includes an IP address of the bootstrap machine and/or a URL address for the bootstrap machine in some embodiments.

The second stage 402 shows that, after receiving the request, the bootstrap machine provides the MCS logical network configuration data 460 to the requesting guest host machine 420 (i.e., to the requesting MFE 440 of the host machine). The configuration data, among other data, includes a VNI of the MCS logical network and the VTEP addresses of the control host machines that implement the MCS logical network (i.e., the VTEP addresses associated with the MFEs that run on the control host machines). This way, the guest host machine knows on which control host machines the MCS machines operate in order to establish communication lines (e.g., tunnels) with the control MFEs of the control host machines and to receive guest logical network(s) configuration data from the MCS machines connected to those control MFEs.

The third stage 403 of the figure shows that the MFE 440 of the guest host machine 420 is coupled to the MCS machines 475 and 485 based on the configuration data received from the bootstrap agent 430. More specifically, although not shown in the figure, a particular port of an MFE 440 (as shown and described above by reference to FIG. 2) is coupled to the MCS machines (through the MFEs operating on the control host machines 470 and 480). This stage also shows that the MFE 440 receives the guest logical network configuration data 490 (e.g., through the assigned configuration port of the MFE).

The fourth stage 404 illustrates how the guest VMs of a logical network communicate with each other based on the received configuration data 490 from the MCS machines 475 and 485. More particularly, this stage shows that based on the received configuration data the MFE running on the guest host machine 420 is able to communicate with the guest host machine 425. That is, based on the configuration data the MFEs of the host machine can implement different logical forwarding elements of the logical network in order to connect the GVMs to each other and to other machines of the same logical network as well other machines of other (logical and/or physical) networks.

For example, when GVM 492 executing on the host machine 420 wants to send a packet 499 to the GVM 496 executing on the host machine 425, based on the VTEP data of the host machines received in the configuration data, the MFE of the host 420 establishes a tunnel 180 with the MFE of the host 425. The MFE of the host 420 receives the packet 499 from the port of the MFE that is mapped to the logical port to which GVM 492 is coupled. The MFE then sends that packet through the tunnel (i.e., encapsulates the packet using the tunneling data and forwards the packet out) to the MFE of the host 425, which, in turn, forwards the packet to GVM 496 through a port of the MFE that is mapped to the logical port of the logical switch to which GVM 496 is coupled.

It is important to note that although only tunnel 180 between the MFE of the host machines is shown in the figure, all of the other MFEs communicate with each other through tunnels too. In other words, the MFEs of the control hosts 470 and 480 also communicate with each other and with the guest MFEs of the hosts 420 and 425 through the tunnels. Additionally, it should be understood that the number of the host machines, MCS machines, and GVM machines are exemplary and for simplicity of description. Otherwise, each of the host machines may execute numerous data compute nodes (e.g., VMs, namespaces, containers, etc.) as MCS and/or guest machines.

As described above, when a host machine, which is connected to an MCS logical network, needs to be decommissioned (i.e., to be removed from the host machines that implement the logical networks), the bootstrap agent and other host machines need to be informed of such a decommissioning. The reason being, as discussed above, the MCS machines do not have control over the MCS logical network in order to update the configuration data for this logical network (e.g., update the VTEP and VNI tables of the remaining host machines to remove the decommissioned host), and thus the bootstrap agent is responsible for handling this removal.

In some embodiments, every time a host machine is decommissioned the MCS machines (e.g., a manager machine of the MCS) informs the other host machines of such. The informed host machines then send a request to the bootstrap agent and receive updated configuration data from the agent to update their configuration tables (i.e., to remove the decommissioned host's data from their configuration and forwarding tables).

Figure 5:
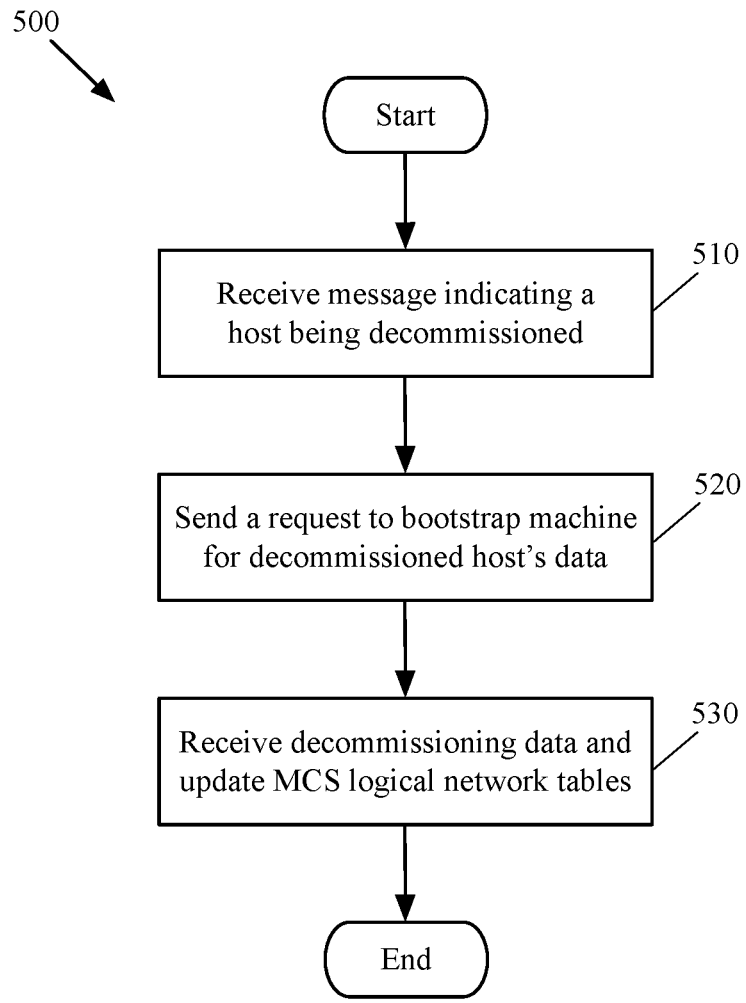
FIG. 5 conceptually illustrates a process of some embodiments for decommissioning a guest host machine from a logical network.

FIG. 5 conceptually illustrates a process 500 of some embodiments for decommissioning a guest host machine from a logical network. That is, this figure shows how the configuration tables of other host machines implementing the logical network are updated when one of the host machines that also implements the logical network is decommissioned. The process 500 is performed by a hypervisor (i.e., an MFE that operates on the hypervisor) of a guest host machine that receives a notification indicating another host machine of the logical network is being decommissioned.

The process starts by receiving (at 510) a message from the management and control system (e.g., a controller of the MCS) indicating that a host machine that implements the logical network should be removed from the logical network. When a host should be decommissioned, the controller is informed of such in order to update the configuration tables (e.g., a set of forwarding tables) of the other host machines. However, the controller does not have any authority to send instructions or updated configuration data to the other hosts that is related to the MCS logical network. As such, the controller only sends a notification to the other hosts informing them that the decommissioning host should be removed from their configuration tables.

When the process receives this notification, the process sends (at 520) a request to the bootstrap agent for receiving updated configuration data for the MCS logical network. The bootstrap agent, upon receiving the request, sends (at 530) the updated configuration data, which includes, among other data, the updated VTEP addresses of the remaining host machines, the updated VNI data, etc. The process then updates the MCS logical network configuration data (e.g., the VTEP and VNI tables) on the host machine. The process the ends.

The specific operations of the process 500 may not be performed in the exact order shown and described. The specific operations may not be performed in one continuous series of operations, and different specific operations may be performed in different embodiments. Additionally, the process 500 could be implemented using several sub-processes, or as part of a larger macro process.

Figure 6:
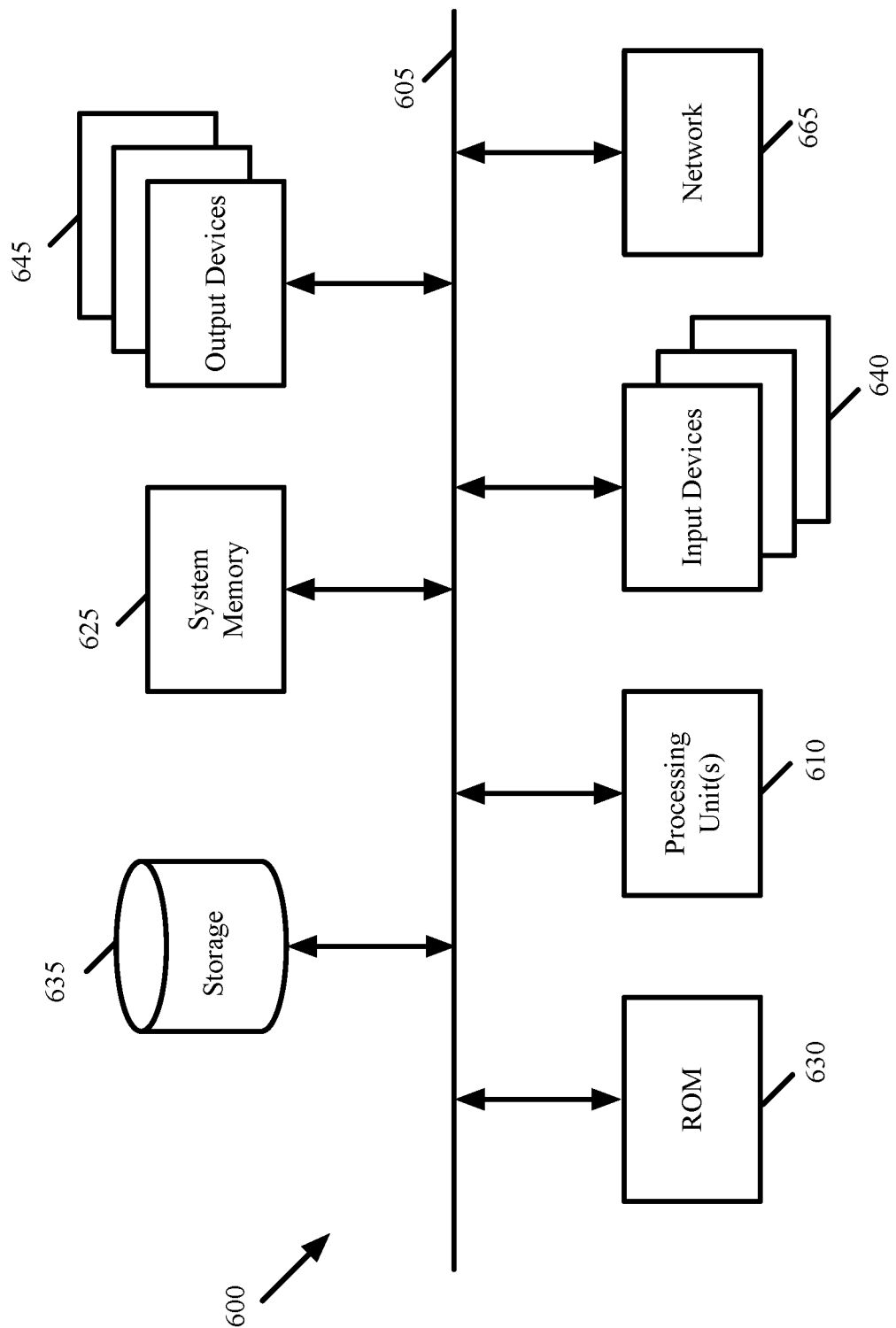
FIG. 6 conceptually illustrates an electronic system with which some embodiments of the invention are implemented.

FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 3 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for connecting to a management and control system (MCS) logical network, the method comprising:
   at a managed forwarding element executing on a host computer, receiving data upon startup that identifies an agent;

connecting to the agent to receive configuration data for the MCS logical network from the agent;

using the configuration data received from the agent to connect to the MCS logical network; and after connecting to the MCS logical network, receiving configuration data for at least one additional logical network from a set of control machines also connected to the MCS logical network, wherein a data compute node (DCN) that executes on the host computer is connected to the additional logical network and the managed forwarding element processes data messages for the additional logical network sent to and from the DCN.

2. The method of claim 1, wherein using the configuration data received from the agent comprises assigning a particular port of the managed forwarding element to exchange control data with the set of control machines.

3. The method of claim 1, wherein the agent is not connected to the MCS logical network.

4. The method of claim 1, wherein the data that identifies the agent is received from a host profile defined for the host computer on which the managed forwarding element executes.

5. The method of claim 1, wherein the host computer on which the managed forwarding element executes is one of a set of host computers of a public hosting system, wherein the additional logical network logically connects a first set of DCNs executing on a first subset of the set of host computers, including the DCN that executes on the host computer.

6. The method of claim 5, wherein:
the additional logical network is a first additional logical network;
the configuration data received from the set of control machines is used to configure the managed forwarding element to implement a first set of logical forwarding elements of the first additional logical network;
the first set of logical forwarding elements connects the DCN executing on the first host computer to the other DCNs of the first set of DCNs executing on the first subset of host computers; and
managed forwarding elements executing on the subset of host computers process data messages for the first additional logical network sent between the plurality of DCNs.

7. The method of claim 6, wherein:
the configuration data received from the set of control machines is further used to configure the managed forwarding element to implement a second set of logical forwarding elements of a second additional logical network;
the second set of logical forwarding elements connects at least a second DCN executing on the host computer to a second set of additional DNCs executing on a second subset of host computers in the set of host computers.

8. The method of claim 1, wherein the configuration data for the additional logical network is received from the set of control machines through a local controller that executes on the same host computer as the managed forwarding element.

9. The method of claim 1, wherein the set of control machines comprises a set of managers and a set of controllers of a management and control system, the management and control system for configuring a plurality of logical networks for one or more tenants.

10. The method of claim 1, wherein the host computer on which the managed forwarding element executes is one of a set of host computers that each executes a managed forwarding element that is connected to one or more DCNs of the additional logical network.

11. The method of claim 10, wherein the set of host computers is a first set of host computers, wherein the set of control machines comprises DCNs that execute on a second set of host computers separate from the first set of host computers.

12. The method of claim 10, wherein the set of host computers is a first set of host computers, wherein the set of control machines comprises DCNs that execute on a second set of host computers, wherein the first and second set of host computers have at least one host computer in common.

13. A non-transitory machine readable medium of a host computer storing a program which when executed by at least one processing unit of the host computer connects the host computer to a management and control system (MCS) logical network, the program comprising sets of instructions for:

receiving, at a managed forwarding element executing on the host computer, data upon startup that identifies an agent;

connecting to the agent to receive configuration data for the MCS logical network from the agent;

using the configuration data received from the agent to connect to the MCS logical network; and receiving, after connecting to the MCS logical network, configuration data for at least one additional logical network from a set of control machines also connected to the MCS logical network, wherein a data compute node (DCN) that executes on the host computer is connected to the additional logical network and the managed forwarding element processes data messages for the additional logical network sent to and from the DCN.

14. The non-transitory machine readable medium of claim 13, wherein the set of instructions for using the received configuration data comprises a set of instructions for assigning a particular port of the managed forwarding element to exchange control data with the set of control machines.

15. The non-transitory machine readable medium of claim 13, wherein the set of instructions for receiving the data upon startup comprises a set of instructions for receiving the data from a host profile defined for the host computer when the host computer boots up.

16. The non-transitory machine readable medium of claim 13, wherein the host computer is one of a set of host computers of a public hosting system, wherein the additional logical network logically connects a first set of DCNs executing on a first subset of the set of host computers, including the DCN that executes on the host computer.

17. The non-transitory machine readable medium of claim 16, wherein
the additional logical network is a first additional logical network,
the configuration data received from the set of control machines is used to configure the managed forwarding element to implement a logical switch of the first additional logical network,
the logical switch connects the DCN executing on the first host computer to the other DCNs of the first set of DCNs executing on the first subset of host computers, and
managed forwarding elements executing on the subset of host computers process data messages for the first additional logical network sent between the plurality of DCNs.

18. The non-transitory machine readable medium of claim 17, wherein the logical switch is a first logical switch, wherein the managed forwarding element is further configured to implement a second logical switch of a second logical network.

19. The non-transitory machine readable medium of claim 13, wherein the program further comprises a set of instructions for removing the host computer from a set of host computers that implements logical forwarding elements of the additional logical network.

20. The non-transitory machine readable medium of claim 19, wherein the set of instructions for removing the host computer comprises a set of instructions for sending a notification to the set of control machines to notify the control machines of its removal, wherein the set of control machines sends a decommissioning message to each host computer in the set of host computers.

21. The non-transitory machine readable medium of claim 20, wherein each host computer, upon receiving the decommissioning message, (i) sends a request to the agent for receiving updated forwarding data from the agent and (ii) updates its forwarding tables upon receiving the updated forwarding data from the agent.

* * * * *